(Model.)
W. S. WOOD.
ORE WASHER.
No. 252,569. Patented Jan. 17, 1882.
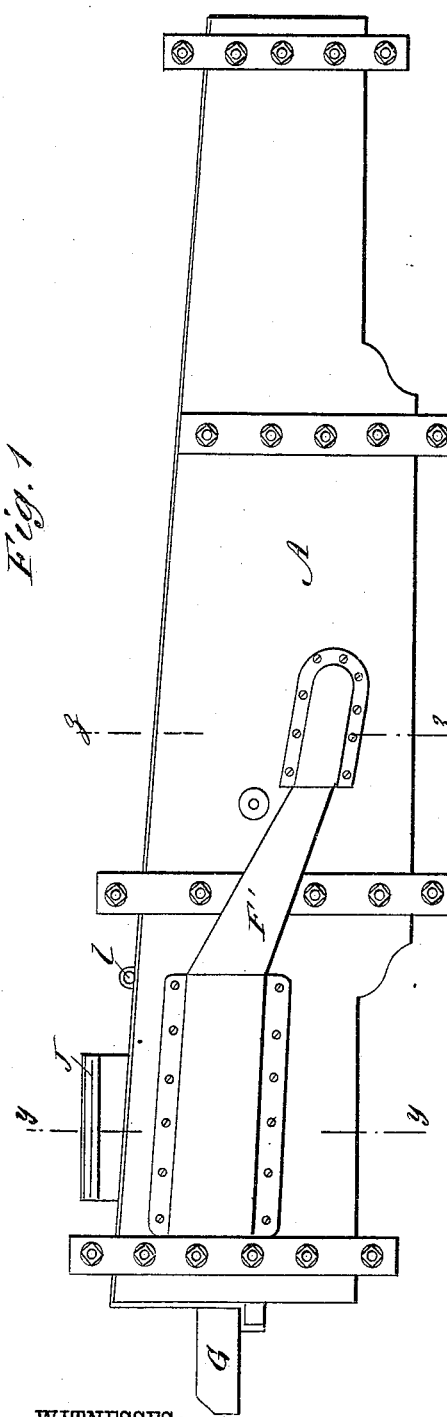
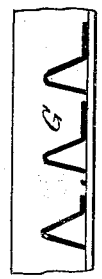
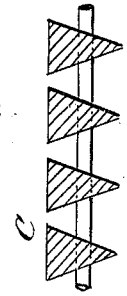
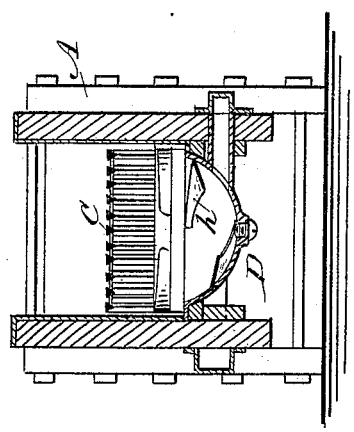
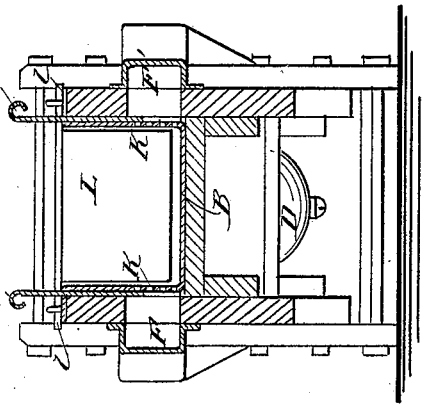
WITNESSES:
C. Neveux
C. Sedgwick
INVENTOR:
W. S. Wood
BY Munn & Co.
ATTORNEYS.

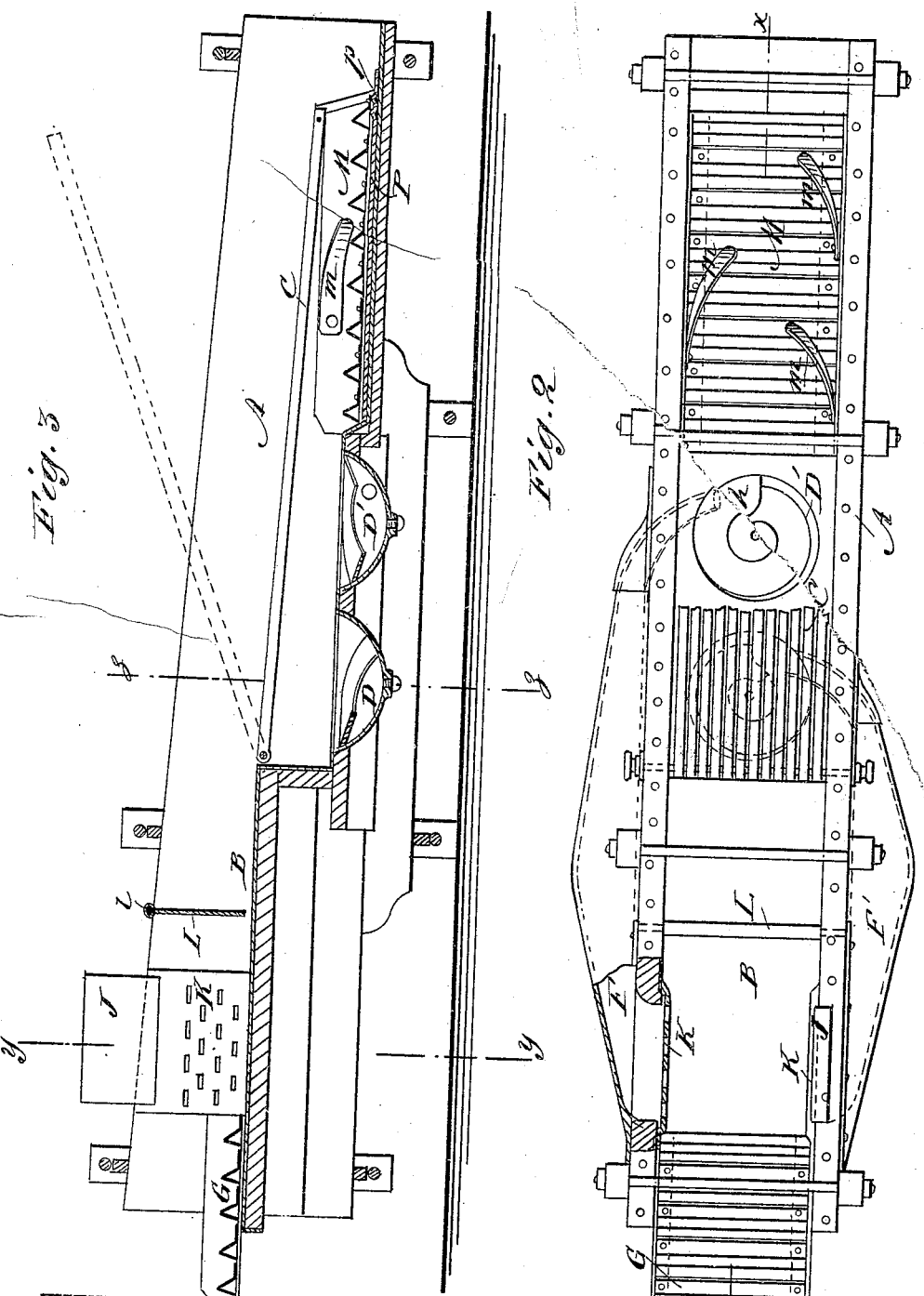

UNITED STATES PATENT OFFICE.

WILLIAM S. WOOD, OF DENVER, COLORADO, ASSIGNOR TO THE COLORADO GOLD SAVING SLUICE BOX COMPANY, OF SAME PLACE.

ORE-WASHER.

SPECIFICATION forming part of Letters Patent No. 252,569, dated January 17, 1882.

Application filed April 23, 1881. (Model.)

*To all whom it may concern:*

Be it known that I, WILLIAM S. WOOD, of Denver city, in the county of Arapahoe and State of Colorado, have invented a new Improvement in Ore-Washers, of which the following is a full, clear, and exact description.

The invention relates to certain improvements on the ore-washer for which Letters Patent No. 209,789, dated November 12, 1878, were heretofore granted to Theophilus T. Allen.

In the accompanying drawings, Figure 1 is a side view of an apparatus embodying my improvements. Fig. 2 is a top view of the same. Fig. 3 is a longitudinal vertical section taken in the line $x\ x$ of Fig. 2. Fig. 4 is a transverse vertical section taken in the line $y\ y$ of Fig. 3. Fig. 5 is a transverse vertical section taken in the line $z\ z$ of Fig. 3. Fig. 6 is a detail view of the nugget-riffles. Fig. 7 is a detail view, in section, of the grating.

A represents a sluice similar to the one described in the patent aforesaid, except that it is constructed in sections secured together by bolts and screws, so that it can be taken apart and transported from place to place on pack animals, or even by men, by which means provision is made for conveying the apparatus through narrow mountain-passes and in other places inaccessible to wheeled vehicles.

The bottom B and grating C are similar to those described in the patent before referred to, except that the grating C is constructed of triangular bars with the flat side up, so that the width of the aperture between two bars is greater at the top than at the bottom, and gravel and other particles can be more easily forced through said apertures than if the bars were square.

The pans D D' are similar to those described in the patent aforesaid, as are also the spiral flanges $h$, except that the latter are made of copper and amalgamated with mercury, by which means they are enabled to catch the flour and float gold from the water and gravel whirling in the pans. These pans are made of cast-iron and both cast in one piece.

The pipes F F', which supply the pans D D', are placed outside of the sluice-box A, instead of inside, as in the patent aforesaid, and they are larger at the receiving end than at the discharging end. By this arrangement of the pipes they are enabled to feed laterally into the pans, and thus produce a combined longitudinal and transverse motion, resulting in a rotary motion of the water in the pans and giving greater speed and power thereto.

At each side of the sluice-box A, opposite the mouth of each pipe F and F', is a screen, K, provided with a vertically adjustable gate, J, the object of which is the same as that of the grating and gate shown in the patent aforesaid. By this means the capacity of the sluice-box is increased.

At the receiving end of the sluice-box is a series of nugget-riffles, G, resting partly on the bottom B and partly in the feeding box or apron of the machine. The object of this device is to arrest the nuggets and coarser particles of gold before they come in contact with the amalgamated copper plate or the mercury in the pans, as it is well known that gold obtained without the use of mercury is more valuable than such as has been passed through a retort. Moreover, this device arrests such nuggets as on account of their shape and size could not pass through the screens K or between the bars of the grating C.

Instead of the gate $l$ shown in the patent aforesaid, I employ a flood-gate, L, which is made of cast-iron, and is hung in bearings $l$ in the upper edges of the sides of the sluice-box. It is sufficiently heavy to impede the flow of water in the flume and cause it to back up in sufficient quantity to supply the pipes F F'.

In the event of drift-wood or heavy bowlders entering the sluice-box they are allowed to escape by forcing the gate to swing forward, and the current of water carries them over the grating C and discharges them at the foot of the sluice-box.

Instead of resting immediately over the pans, as in the patent aforesaid, the riffles M in this invention are placed between the pans and the discharge end of the sluice, immediately over the amalgamated plate P, and are countersunk, so that the top edges of the riffles are on a level with the top of the pans. Each riffle is formed with a vertical side toward the front end of the sluice and an inclined side toward the foot. They thus give an undershot direction to the water, enabling it to keep the amalgamated plate P clear of sand, and by their location they allow small particles of gold to drop directly on the amalgamated plate.

Instead of the angular plates *f* shown in the patent aforesaid, the sides of the riffles M are provided with plates *m*, which are curved somewhat in the form of a plow mold-board. By this construction a combined whirling, fluttering, and zigzag motion is imparted to the water, so as to hold in suspension the sand and lighter particles of gravel and allow the gold to settle.

The amalgamated plate P is provided with a series of corrugations, *p*, near the discharge end, the object of which is to prevent the mercury from being carried off by the flow of water through the sluice.

Having thus described my invention, what I claim as new, and desire to secure by Letters Patent, is—

1. The combination, with the sluice-box A, bottom B, and screens K, of the nugget-riffles G, arranged as shown and described, for the purpose specified.

2. The combination, with the sluice-box A, of the flood-gate L, having bearings *l* in the upper edge of the sides of the said sluice-box, and of sufficient weight to impede the flow of water in the flume, substantially as and for the purpose set forth.

3. The combination, with the sluice-box A and the amalgamated plate P, of the riffles M, arranged in the discharge end of the said sluice-box over the amalgamated plate, so that the top edges will be on a level with the top of the pans, and provided with the mold-board-shaped plates or wings *m*, secured to its sides, substantially as and for the purpose set forth.

WILLIAM S. WOOD.

Witnesses:
ADOLPH L. RICHARD,
JAS. A. DAWSON.